United States Patent [19]
Wexler

[11] Patent Number: 5,456,426
[45] Date of Patent: Oct. 10, 1995

[54] ATTACHMENT FITTING FOR A WALL OF A FLEXIBLE STRUCTURE

[75] Inventor: Mark H. Wexler, Studio City, Calif.

[73] Assignee: Lockheed Corporation, Calabasas, Calif.

[21] Appl. No.: 223,419

[22] Filed: Apr. 4, 1994

[51] Int. Cl.⁶ .................................. B64B 1/50; B64C 1/12
[52] U.S. Cl. .............................. 244/127; 244/33; 244/132
[58] Field of Search ................................ 244/30, 31, 33, 244/96, 126, 127, 132; 383/6, 7, 12

[56] References Cited

U.S. PATENT DOCUMENTS

| | | | |
|---|---|---|---|
| 1,272,058 | 7/1918 | Kraft | 244/127 |
| 3,108,765 | 10/1963 | Stone . | |
| 3,119,579 | 1/1964 | Borgeson et al. | 244/31 |
| 3,521,836 | 7/1970 | Struble | 244/33 |
| 3,993,269 | 11/1976 | Crosby, Jr. | 244/31 |
| 4,090,682 | 5/1978 | Parsons | 244/31 |
| 4,125,233 | 11/1978 | Winker | 244/33 |
| 4,261,448 | 4/1981 | Myers | 190/43 |
| 4,267,989 | 5/1981 | Skaggs | 244/31 |
| 4,280,674 | 7/1981 | Crosby, Jr. | 244/99 |
| 4,390,149 | 6/1983 | Barnes et al. | 244/31 |
| 4,479,243 | 10/1984 | Derby et al. | 383/24 |
| 4,619,620 | 10/1986 | Felter | 441/66 |
| 4,635,581 | 1/1987 | Scheurer | 441/67 |
| 4,747,797 | 3/1988 | Hindle | 441/38 |
| 4,749,156 | 6/1988 | Davenport et al. | 244/145 |
| 4,757,777 | 7/1988 | Rosenberger | 114/39.1 |
| 4,968,278 | 11/1990 | Lemke et al. | 441/129 |
| 5,297,978 | 3/1994 | Ramsey | 441/131 |

FOREIGN PATENT DOCUMENTS

| | | | |
|---|---|---|---|
| 337830 | 6/1921 | Germany | 244/127 |
| 2248815 | 4/1992 | United Kingdom | 244/126 |

*Primary Examiner*—Andres Kashnikow
*Assistant Examiner*—Virna Lissi Mojica
*Attorney, Agent, or Firm*—Louis L. Dachs

[57] ABSTRACT

The invention is an attachment fitting for use on the flexible wall of a structure. In detail, the fitting includes a slot in the wall of the structure. A first flexible member is included having a center portion folded over its self forming a loop extending through the slot from a first side of the wall and out from the second side, and outer fan shaped portions on each end of the center portion bonded to the first side of the wall of the structure adjacent to the slot. The first flexible member further includes a plurality unidirectional reinforcing filaments in a matrix material with the filaments being parallel to each other in the center portion and fanning out from each other in each of the outer portions. A second flexible member having a periphery extending about the slot and the outer portions of the first flexible member is bonded thereto and to the first side of the flexible wall of the structure.

8 Claims, 3 Drawing Sheets

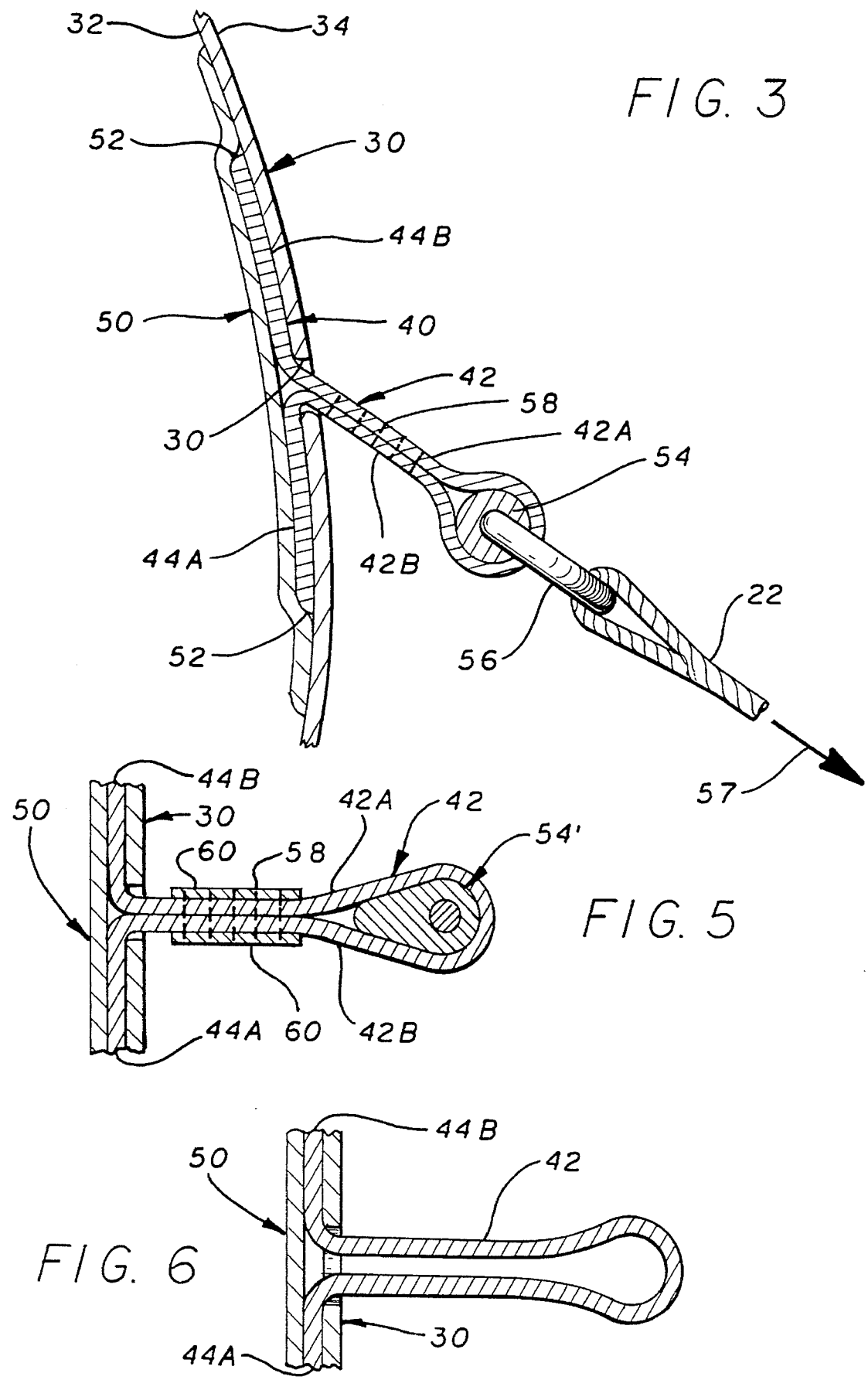

ATTACHMENT FITTING FOR A WALL OF A FLEXIBLE STRUCTURE

BACKGROUND OF THE INVENTION

1. Field of the Invention

The invention relates to the field of flexible structures and, in particular, to a design for an attachment fitting for such structures. The attachment fitting is particularly useful on pressurized structures such a lighter-than-air vehicles and inflatable boats.

2. Description of Related Art

On flexible structures, attachment fittings and the like are normally just sewn directly thereon much like a button on a shirt. Sometime the reinforcements are sewn or bonded on both sides to add support. However, such fittings stitched or bonded in such a manner tend to "rip" away from the structure when under high tension loads, again much like a button ripping off from a shirt. For example in U.S. Pat. No. 4,125,233, "Tethered Aerodynamic Balloon With Integral Fins" by J. A. Winker, et.al. an attachment fitting is disclosed in the form of a loop with end portions bonded to the outer surface of a balloon. The end portions are "criss-crossed" with reinforcing strips bonded thereover. U.S. Pat. No. 3,108,765, "Balloon Having an External Ballonet" by V. H. Stone discloses a somewhat similar design. In addition, the V. H. Stone attachment fitting incorporates a load distributing fitting in the end of loop with the sides of the loop reinforced and joined together. Because the fitting is subject to cyclic tension loads there is always the tendency to Peel away the reinforcements. Thus it is important to distribute such tension loads into the main structure. Additionally, if the flexible structure is pressurized, stitching the attachment fitting thereon will create an unacceptable leakage path.

Also of interest is U.S. Pat. No. 4,267,989, "Toy Hot Air Balloon" by K. D. Skaggs. K. D. Skaggs disclosed an attachment fitting that includes a hole in the wall of the structure perpendicular to the specific direction of the tension load. A first flexible member is included having a center portion folded in half forming a loop extending through the slot. Attached to the loop are end portions bonded to the inside surface of the wall of the structure. Second flexible members are bonded over these end portions of the first flexible member. This design better distributes the tension load from the loop to the flexible structure, via shear load through the bond between the end portions of the first flexible members. However, the hole in the structure is not sealed; thus it is unusable in a pressurized structure. As used in the toy balloon, it is attached to an un-pressurized cap at the top thereof. However, others have modified the K. D. Skaggs design by extending the second flexible member to completely cover the first flexible member so that the attachment fitting can be used on pressurized structures. However, these designs do not provide for optimizing the distribution of loads into the structure eliminating or reducing local stress concentrations. Furthermore, if the flexible structure is an inflatable boat or the gas bag of a lighter-than-air vehicle, failure of the joint should not cause a leak therein.

Thus it is a primary object of the subject invention to provide an attachment fitting for a flexible structure.

It is another primary object of the subject invention to provide an attachment fitting for a flexible structure wherein stress loads are distributed into the structure, eliminating local stress concentrations.

It is a further object of the subject invention to provide an attachment fitting for a pressurized flexible walled structure.

SUMMARY OF THE INVENTION

The invention is an attachment fitting for use on a flexible wall of a structure for distributing a tension load therein. In detail, the fitting includes a slot in the wall of the structure. In order to reduce the possibility of stress induced loads from ripping the structure at the ends of the slot, stress concentration reducing cutouts are included on either end thereof; preferably, these stress concentration reducing cutouts are circular shaped. A first flexible member is included having a center portion folded over on its self forming a loop extending from a first side of the wall through the slot and out from the second side. The first flexible member further includes fan shaped outer portions on each end of the center portion bonded to the inner surface of the wall of the structure adjacent to the slot.

The first flexible member further includes a plurality unidirectional reinforcing filaments in a matrix material with the filaments being parallel to each other in the center portion and fanning or spreading uniformly in each of the outer portions. The filamentary material could be any high strength filamentary material such as KEVLAR™, or DACRON™, with are available from the I. E. du Pont de Nemours and Company, Wilmington, Del. VECTRAN™ filamentary material manufactured by Hoechst-Celanses, Somerville, New Jersey, as well as graphite and fiberglass can also be used. A wide variety of resins can be used as the matrix material, for example, urethane thermoplastic. In a lighter-than-air gas bag made up of various layers of VECTRAN™ and KEVLAR™ using a urethane resin matrix material, the first flexible member could made from KEVLAR™ filamentary material with a similar urethane resin matrix material. With such a combination, the first flexible member could be easily bonded by heat and pressure to the structure. Again, a wide variety of filamentary and resin matrix materials are commercially available.

The fan shaped outer portions insure that the tension load is uniformly distributed into the structure over a wide area; thus, their size will be a function of the load. However, the outer portions need not necessarily be the same size. For example, if the tension load were primarily directed at an acute angle to one of the outer portions, then the tension load would be primarily distributed into the opposite outer portion and it would be proportionally larger the first mentioned outer portion. In a pressurized structure it is important that the attachment fitting fail without causing a leak in the structure. Thus the fitting should be designed to have the loop or center portion fail prior to failure of the bond between the fan shaped outer portions, that is, before, the bond between the outer portions and flexible structure. The use of the fan shaped outer portions which better distributes the tension load into the flexible structure helps to insure that this requirement met. The fans shaped outer portions also better absorb "off axis" loads.

A second flexible member having a periphery extending about the slot and the outer portions of the first flexible member is bonded thereover and to the adjacent surface of the flexible wall of the structure. This second flexible member serves a dual purpose. The first is to provide additional strength to the attachment fitting by reinforcing the attachment of the first flexible member to the wall of the structure. Secondly, if the structure is pressurized, such as the gas bag of a lighter-than-air vehicle or an inflatable boat or raft, it acts as a seal preventing gas from leaking through the slot. Material used in the second flexible member must be compatible with and bondable to the structure and first flexible member.

In some applications, it may be desirable to have a portion of the sides of the loop extending from a point in proximity to the second side of the wall toward the free end joined together. This can be accomplished by cross stitching the sides together. Reinforcing members (either ridged or flexible) can be positioned over the joined portions of the sides of the loop to add strength. Additionally, a load distributing member can be installed into the end of the loop to better distribute the tension load thereto. For example, a metal shaft having end fittings for securing the ends of a clevis attached to a cable such as a mooring line. Alternately, a hollow shaft can be installed for supporting a load carry pin.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 3 is a cross-sectional view of the attachment fitting shown in FIG. 2 taken along the line 3—3.

FIG. 5 is a partial is view of the attachment fitting shown in FIG. 3, illustrating the addition of reinforcements to the sides of the loop and the installation of a metal attachment tube within the loop.

FIG. 6 is a partial is view of the attachment fitting shown in FIG. 2, illustrating a center loop portion as formed without reinforcements or the installation of an attachment fitting therein.

DESCRIPTION OF THE PREFERRED EMBODIMENT

Figure 1:
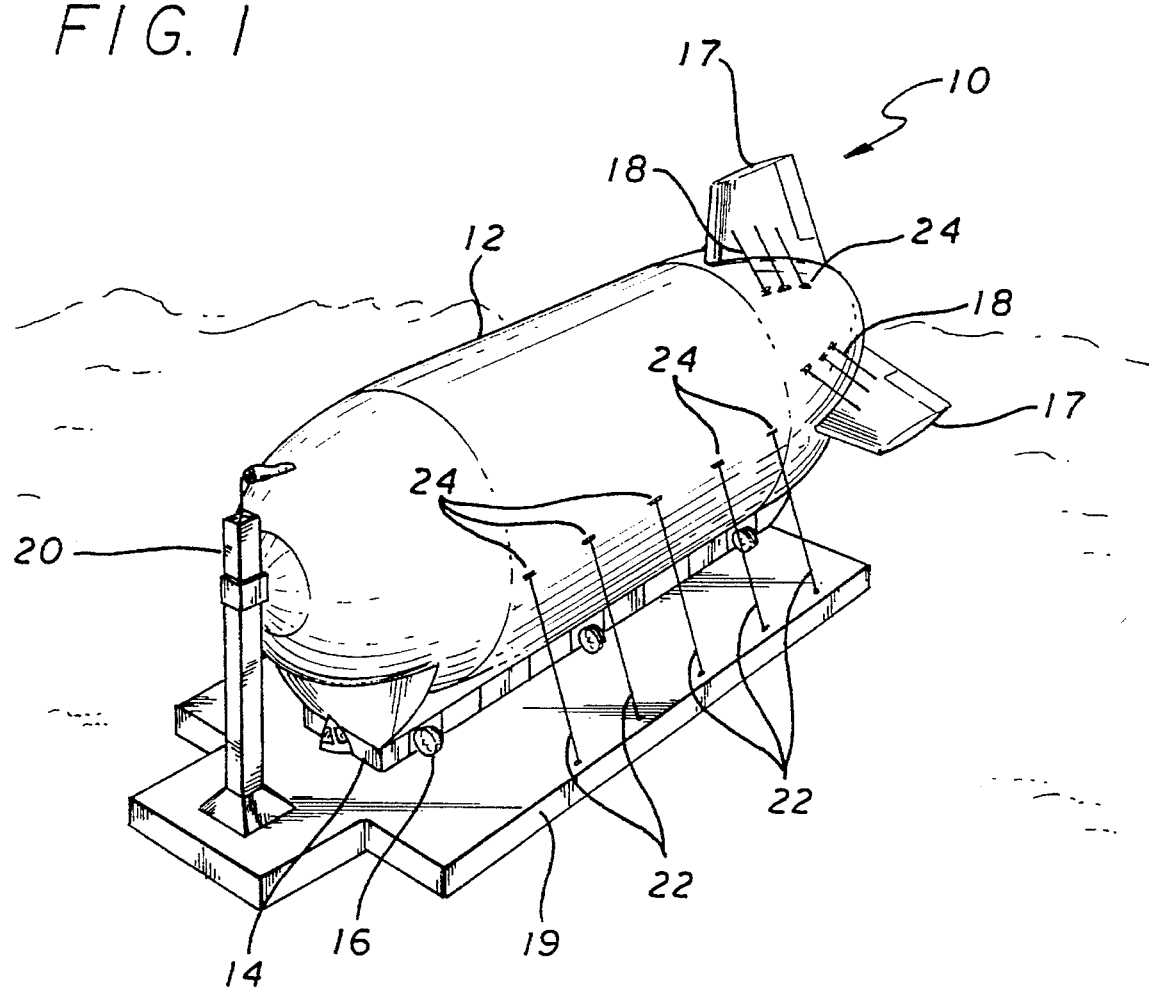
FIG. 1 is perspective view of a lighter-than-air vehicle.

Illustrated in FIG. 1 is a non-ridged lighter-than-air vehicle, generally indicated by numeral 10. The vehicle 10 includes a flexible gas bag 12 having a gondola 14 suspended from the bottom thereof and thrust producing assemblies 16 attached to the gondola. The vehicle further includes a plurality of fins 17 mounted on the rear thereof supported by bracing wires 18. The vehicle 10 is shown docked on a platform 18, secured thereto at its nose to a tower 20 and by a plurality of mooring lines 22 along its length directly to the platform. These mooring lines 22, as well as the bracing wires 18 are attached directly to the gas bag by the subject attachment fittings, indicated by numeral 24. It is important to note that the example application is for purposes of illustration only and the attachment fitting can be used on any flexible wall structure; however, it is most useful on pressurized flexible structures, such as the gas bag illustrated above.

Figure 2:
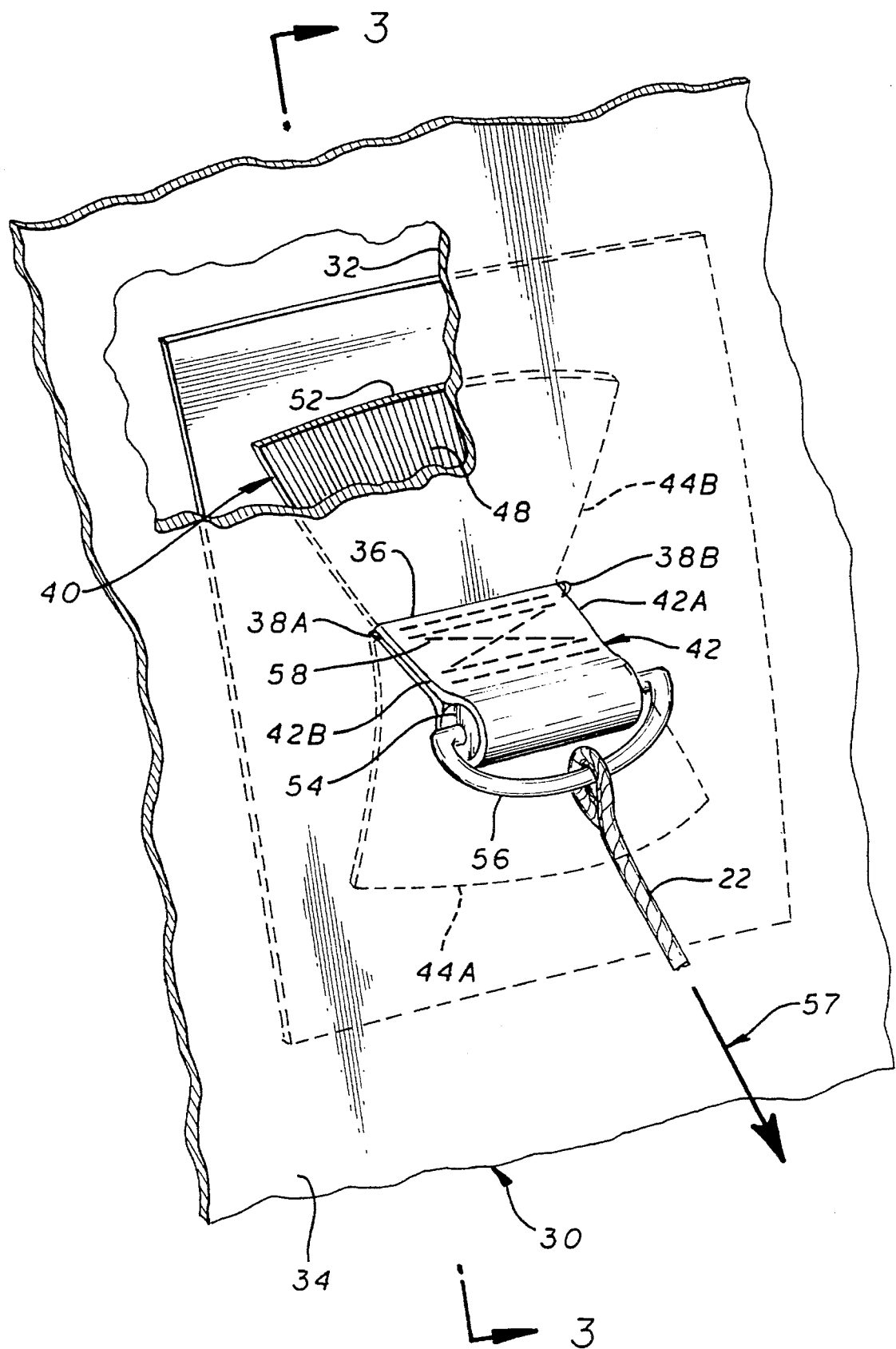
FIG. 2 is partial perspective view of the vehicle gas bag illustrating the attachment fitting.

Referring now to FIGS. 2 and 3, it can be seen that the wall 30 of the gas bag 12 has an inner side 32 and outer side 34 with an elongates slot 36 extending therethrough. The slot 36 has circular cut outs 38A and 38B at either end thereof that act as rip "stoppers". By having such a cutout at the end of the slot 36 there is far less tendency to tear under load. Of course other cutout shapes can be used as long as they have the effect of distributing stress loads over a wide area. A first flexible member 40, that acts as the primary attach point, includes a center portion 42 in the form of a loop having sides 42A and 42B having a width generally equal to the width of the slot 36. The loop extends through the slot 36 from the inner side 32 and beyond the outer side 34. The first flexible member 40 also includes fan shaped outer portions 44A and 44B on either end thereof that are bonded to the inner side 32 of the wall 30 adjacent to the slot 36.

Figure 4:
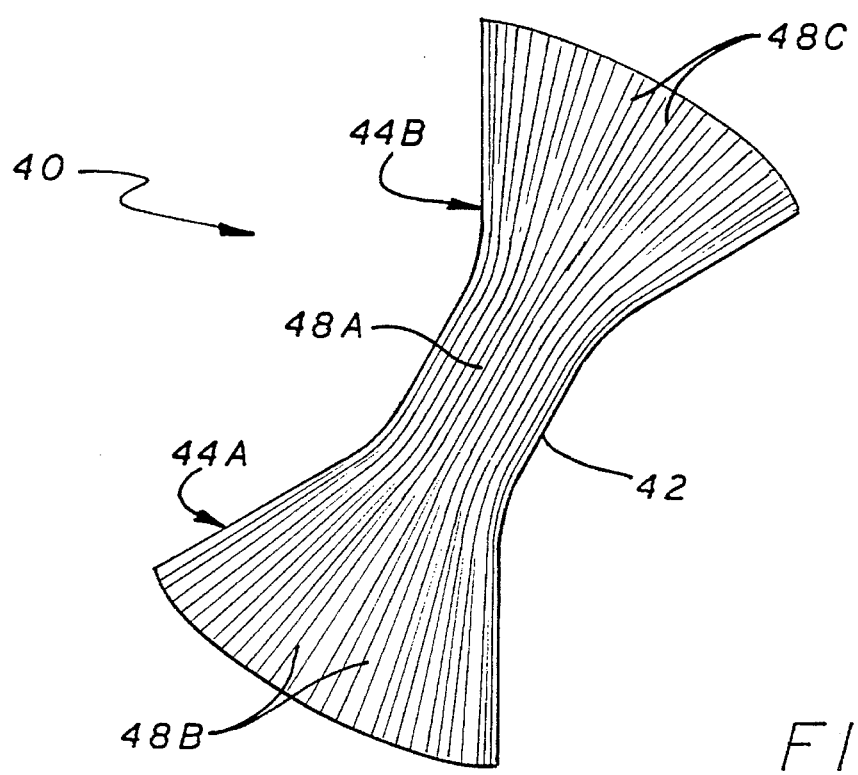
FIG. 4 is front view of the first flexible member prior to forming the center portion into a loop illustrating the distribution of filamentary material therein.

FIG. 4 is a view of the first flexible member 40 prior to the forming of the center portion 42 into a loop. The member 40 is made of strands of unidirectional filamentary material 48 embedded in a flexible resin matrix material 49. The filamentary material 48 is closely packed in the center portion 42 (indicated by numeral 48A) and uniformly spread out into the fan shaped outer portions 44A and 44B (indicated by numeral 48B). The filamentary material can be selected from any of the high strength structural fibers, such as KEVLAR™, DACRON™, VECTRAN™ graphite, fiberglass, etc. The member 40 can also be made in any number of ways. For example, the filamentary material could be laid up in a mold having the shape of the member with a plurality of pins equally spaced about the peripheral ends of the fan shaped end portions. The filamentary material could be laid up in the mold with the ends tied off in tension about the pins. The unidirectional filamentary material could incorporated harness weaving to maintain filament spacing. Thereafter a resin could be injected into the mold. A suitable resin is thermoplastic urethane. This would allow bonding to the inner side 32 of the wall 30 by the application of pressure and heat; however, any resin selected must be bondable to the wall.

Referring back to FIGS. 2 and 3, a second flexible member 50 is bonded over the first flexible member 40 and extends about the periphery 52 thereof and the slot 36 and is bonded to the inner side 32 of the wall 30. Thus the second flexible member provides a gas tight seal about the slot 36 and the first flexible member 40 as well as providing additional strength to the fitting. The loop formed by center portion 42 contains a load distribution member 54 mounted therein. A clevis 56 is attached to the end of the mooring line 22 (also see FIG. 1). Additionally the sides 42A and 42B of the loop are joined together by stitching 58 to prevent independent movement of the sides and to secure the member 54 in its proper position at the end thereof.

Note that in this particular version of the attachment fitting 24 the tension load, indicated by numeral 57, is always in a predominately downward position. Thus the major portion of the tension load 57 induced into the first flexible member will be absorbed by the outer portion 44B. Therefore, it is proportionally larger than side portion 44A; the actual size, of course, being dependent on the actual tension load. The fan shape, with the filamentary material evenly distributed therein, provides for the distribution of the load into the wall 30 of the gas bag 12 and can even distribute "off axis" loads. Note also that tension loads are primarily distributed from the first flexible 40 member to the wall 30 in shear along the bond line therebetween. There is very little tendency to "rip" along the slot 36. Of course, if the tension load is predominately perpendicular to the structure, the outer portions 44A and 44B would be equal in size. In such pressurized structures, it is always important to design the attachment fitting such that the loop fails in tension, rather than in a shear failure along the bond between the outer portions and the structure, thus insuring that a leak path is not generated upon failure.

FIG. 5 illustrates the addition of reinforcing members 60 to the stitched together loop to add additional support. Also, note that a reinforcing member 62 installed in the end of the loop is tapered on one end. This shape aids in distributing the tension load. Additionally, in FIG. 6 there is shown a center portion with an un-joined loop and no reinforcing member therein to illustrate that the sides of the loop need not be joined together, nor is a reinforcing member required in many applications.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the aircraft industry and also to any industry that manufactures flexible structures.

I claim:

1. An attachment fitting for supporting a tension load applied to a flexible wall of a structure, the flexible wall being pressurized from a first side and the tension load applied from the second side, said fitting comprising:

a slot in the wall of the structure;

a first flexible member having a center portion folded in half forming a loop extending from the first side of the wall through said slot and out from the second side, and outer fan shaped portions on each end of said center portion bonded to the first side of the wall of the structure adjacent to said slot, said first flexible member comprising a plurality unidirectional reinforcing filaments in a matrix material with the filaments being parallel to each other in the center portion and fanning out from each other in each of said outer portions; and a second flexible member completely covering said outer portions of said first flexible member and said slot in the wall, said second flexible member having a periphery extending about said slot and said outer portions of said first flexible member, said second flexible member bonded to said outer portions of said first flexible member and to the first side of the flexible wall of the structure extending about the periphery of said outer portions of said first flexible member such that said slot is sealed off between the first and second sides of the wall and said first flexible member is reinforced.

2. The attachment fitting as set forth in claim 1 comprising:

said slot in said wall is elongated; and said center portion of said first flexible member has a width generally equal to said width of said slot.

3. The attachment fitting as set forth in claim 2 further comprising stress concentration reducing cutouts on either end of said slot and said second flexible member extends beyond and about said cutouts.

4. The attachment fitting as set forth in claim 3 wherein said stress concentration reducing cutouts are circular shaped.

5. The attachment fitting as set forth in claim 1, or 3, or wherein a portion of the loop extending from a point in proximity to the second side of the wall toward the free end of the loop are joined together.

6. The attachment fitting as set forth in claim 5 wherein reinforcing members are joined to said joined portions of the sides of said loop.

7. The attachment fitting as set forth in claim 6 wherein said reinforcing members are flexible.

8. The attachment fitting as set forth in claim 7 wherein a load distributing member is mounted in the un-joined portion of said loop.

* * * * *